(12) United States Patent
Rischen et al.

(10) Patent No.: US 10,927,984 B2
(45) Date of Patent: Feb. 23, 2021

(54) FITTING WITH A COATING, PIPELINE SYSTEM AND USE OF THE FITTING OR OF THE PIPELINE SYSTEM

(71) Applicant: Viega Technology GmbH & Co. KG, Attendorn (DE)

(72) Inventors: Christian Rischen, Eslohe (DE); Bernd Franke, Finnentrop-Schoenholthausen (DE); Peter Massow, Hilchenbach (DE); Manuel Ochibowski, Olpe (DE)

(73) Assignee: Viega GmbH & Co. KG, Attendorn (DE)

( * ) Notice: Subject to any disclaimer, the term of this patent is extended or adjusted under 35 U.S.C. 154(b) by 215 days.

(21) Appl. No.: 15/551,520

(22) PCT Filed: Feb. 11, 2016

(86) PCT No.: PCT/EP2016/052901
§ 371 (c)(1),
(2) Date: Aug. 16, 2017

(87) PCT Pub. No.: WO2016/131700
PCT Pub. Date: Aug. 25, 2016

(65) Prior Publication Data
US 2018/0038524 A1  Feb. 8, 2018

(30) Foreign Application Priority Data
Feb. 20, 2015  (DE) .......................... 10 2015 102 404

(51) Int. Cl.
*F16L 13/00* (2006.01)
*F16L 13/14* (2006.01)

(52) U.S. Cl.
CPC .................................. *F16L 13/146* (2013.01)

(58) Field of Classification Search
CPC ........ F16L 13/146; F16L 13/16; F16L 13/161
See application file for complete search history.

(56) References Cited

U.S. PATENT DOCUMENTS 3,827,727 A * 8/1974 Moebius ............... F16L 13/146
285/27
4,026,006 A 5/1977 Moebius
(Continued)

FOREIGN PATENT DOCUMENTS

DE 202005008126 U1 10/2006
EP 2586708 A2 5/2013
(Continued)

*Primary Examiner* — David Bochna
*Assistant Examiner* — James A Linford
(74) *Attorney, Agent, or Firm* — The Webb Law Firm

(57) ABSTRACT

A fitting for a sealing, non-releasable pipe connection, including a main fitting body for accommodating at least one pipe which is to be connected, and at least one pressing sleeve. The main fitting body and the pressing sleeve have pressing surfaces, which are assigned to one another. The main fitting body has a pressing surface which, in the installed state, is directed towards the pipe which is to be connected, and is assigned to a peripheral region of the main fitting body. The pressing surfaces assigned to one another on the main fitting body and on the pressing sleeve are formed such that the action of pushing the pressing sleeve axially onto the main fitting body gives rise to the peripheral region of the main fitting body being narrowed radially.

18 Claims, 6 Drawing Sheets

(56) References Cited

U.S. PATENT DOCUMENTS

| | | | | |
|---|---|---|---|---|
| 4,061,367 A | * | 12/1977 | Moebius | F16L 13/146 |
| | | | | 285/382.2 |
| 4,325,571 A | * | 4/1982 | Funderburg | F16L 13/146 |
| | | | | 285/148.23 |
| 4,705,302 A | * | 11/1987 | Beiley | F16L 13/146 |
| | | | | 174/94 R |
| 4,858,968 A | | 8/1989 | Moebius | |
| 5,181,752 A | | 1/1993 | Benson et al. | |
| 5,560,661 A | | 10/1996 | Babel et al. | |
| 2008/0001404 A1 | | 1/2008 | Nicholson | |
| 2013/0099490 A1 | | 4/2013 | Kwon et al. | |
| 2015/0321238 A1 | | 11/2015 | Hofmann | |

FOREIGN PATENT DOCUMENTS

| | | |
|---|---|---|
| RU | 138954 U1 | 3/2014 |
| WO | 2014000897 A1 | 1/2014 |

\* cited by examiner

FITTING WITH A COATING, PIPELINE SYSTEM AND USE OF THE FITTING OR OF THE PIPELINE SYSTEM

CROSS-REFERENCE TO RELATED APPLICATIONS

This application is the United States national phase of International Application No. PCT/EP2016/052901 filed Feb. 11, 2016, and claims priority to German Patent Application No. 102015102404.7 filed Feb. 20, 2015, the disclosures of which are hereby incorporated in their entirety by reference.

BACKGROUND OF THE INVENTION

Field of the Invention

The invention relates to a fitting for a sealing, non-releasable pipe connection, having a main fitting body for accommodating at least one pipe which is to be connected, and having at least one pressing sleeve, wherein the main fitting body and the pressing sleeve have pressing surfaces which are assigned to one another, wherein the main fitting body has a pressing surface which, in the installed state, is directed towards the pipe which is to be connected and is assigned to the peripheral region of the main fitting body, and wherein the pressing surfaces assigned to one another on the main fitting body and on the pressing sleeve are formed such that the act of pushing the pressing sleeve axially onto the main fitting body gives rise to the peripheral region of the main fitting body being narrowed radially. The invention further relates to a pipeline system having such a fitting and to the use of a fitting or pipeline system according to the invention in a heating installation, air-conditioning installation, sanitary installation or drinking water installation or in an installation for conveying technical or medical fluids.

Description of Related Art

Fittings of the type mentioned at the outset are usually used in pipeline systems in order to connect pipes together in a metallically sealing and non-releasable manner. A generic fitting is known from WO 2014/000897 A1, for example.

According to WO 2014/000897 A1, in order to produce a metallically sealing non-releasable pipe connection firstly a pipe end of the pipe to be connected is inserted into an opening of the main fitting body, so that the main fitting body circumferentially encloses the pipe end. The pressing sleeve is pushed onto the main fitting body in the axial direction by means of a pressing tool, wherein "the axial direction" is oriented along the longitudinal extension of the pipe end and hence transverse to the pipe cross-section. The diameter of the inner lateral surface of the pressing sleeve is tapered over the length of the pressing sleeve measured in the axial direction, so that when the pressing sleeve is pushed on axially, the periphery or the peripheral region of the main fitting body is flanged and pressed into the pipe end to be connected. In other words, the periphery or peripheral region of the main fitting body is radially narrowed in its diameter. Therefore, pushing the pressing sleeve on axially is translated into a radial deformation of the main fitting body by means of the preferably tapered lateral surface provided on the pressing sleeve. The "radial direction" is oriented transverse to the longitudinal extension of the pipe end to be connected and transverse to the axial direction. In this way, the main fitting body and the pipe end are plastically deformed and pressed together by pushing the pressing sleeve on axially.

Tests according to international standards for refrigeration engineering gas and water installations, practical tests and installation site simulations have shown that leaks can occasionally occur with the fittings described in WO 2014/000897 A1 depending on the operating loads occurring or the quality of the pipes to be connected. Thus, for example, bending or torsional stresses or surface damage (e.g. grooves) on the pipes to be connected can result in insufficient leak tightness in the area of the pipe connection.

In order to make press fittings more robust with respect to bending or torsional stresses, it is known to additionally secure these connections mechanically. It is also known to correct with adhesives defects on the surfaces of the pipe ends to be connected and in this way seal the pipe. However, both variants increase the material costs of the pipe connection and also make installing the fitting more complex.

SUMMARY OF THE INVENTION

Fittings with a coating made of a soft metal are known from U.S. Pat. No. 5,560,661 A, wherein the thickness of the metallic layer is 2.5 µm or less. The coating is provided to enhance the leak tightness of the pipe connection.

Against this background, the present invention relates to a fitting and a pipeline system of the type mentioned at the outset and a use of the same which do not have or at least only to a lesser extent have the previously mentioned disadvantages and in particular simplify the installation. This is achieved according to the invention by a fitting, by a pipeline system provided with such a fitting and by the use of the fitting and of the pipeline system, wherein the fitting is characterised in that a coating is provided on at least one of the pressing surfaces, wherein the coating consists of a material which is softer than that of the pressing sleeve and/or of the main fitting body and/or of the pipe.

In this text, the term "softer" means that the material which is softer in each case has a lower hardness compared to another material.

Coating at least one of the pressing surfaces with a material which is softer than that of the pressing sleeve and/or of the main fitting body reduces the sliding friction occurring between the pressing sleeve and the main fitting body and/or between the main fitting body and the pipe to be connected during pressing. The coating produces a lubricating effect when the fitting and the pipe are pressed. The axial joining forces required overall for radially deforming the main fitting body and the pipe to be connected are reduced by the lubricating effect of the coating during the pressing process. The main fitting body is compressed less in the axial direction due to the reduced axial joining forces. The reduced compression produces a flatter, enlarged contact surface between the main fitting body and the pipe to be connected, so that the leak tightness of the pipe connection is improved overall. Depending on the coating material, the coating also serves as a protection against corrosion in the area of the coated pressing surface. In addition, a stopper can form from the coating material between the main fitting body and the pipe to be connected, due to the joining or the operating loads, which additionally seals the joint.

According to the invention, the coating can be provided between the pressing surfaces of the pressing sleeve and of the main fitting body assigned to one another. Alternatively or additionally, according to the invention the coating can be provided on the pressing surface of the main fitting body which, in the installed state, is assigned to the pipe to be connected.

If the coating is provided on the pressing surface of the main fitting body which, in the installed state, is assigned to the pipe to be connected, the coating material can correct possible surface damage on the end section of the pipe assigned to the main fitting body by the coating material filling in, and hence sealing, for example, unevenness, grooves, chips or other defects on the pipe surface during the pressing process. According to one preferred embodiment of the fitting, the coating material is softer than the material of the pipe to be connected.

The fitting and the pressing sleeve are preferably essentially rotationally symmetrical and are in particular provided for connecting pipes having a circular cross-section. In addition to at least one cylindrical section, at least one section with a variable diameter, in particular a conical section, is also provided.

Therefore a fitting is available, in which installing the fitting is made easier due to the reduced joining forces required. In addition, the contact between the main fitting body and the pipe to be connected, which is critical for leak tightness, is improved by less compression of the main fitting body and, as the case may be, the surface defects sealed during pressing. The fitting according to the invention therefore enables a robust, sealing pipe connection to be produced in a simple and cost-effective way.

The coating can be formed from a soft metal or from a soft metal alloy. The coating can, for example, consist of at least one of the metals tin, zinc, bismuth, lead, cadmium, antimony, aluminium, copper, indium or alloys thereof. According to a further embodiment, at least one of the pressing surfaces is tin-plated.

Such a fitting having a coating consisting of a soft metal or a softer metal alloy can be used as a metallically sealing connector in a pipeline system, wherein metallically sealing connectors must also meet high requirements placed on leak tightness, as often required e.g. in air-conditioning technology and refrigeration engineering. Therefore, such a fitting is suitable, for example, for installations for conveying medical fluids, in particular medical gases, or for installations for conveying refrigerants. In addition, metallic connections are robust against temperature fluctuations and also suitable for high pressures.

The pressing sleeve and/or the main fitting body and/or the pipe to be connected can, for example, be formed from a steel material, in particular a high-grade steel material, or a copper material, in particular brass, red bronze, silicon bronze or aluminium or aluminium alloys, wherein the respective material has a higher hardness than the material of the coating. Multi-layer composite pipes consisting of high-grade steel/plastic or copper/plastic, as well as fibre-reinforced composites, are additionally eligible as materials for the pipe to be connected. The hardness of the materials is determined by the known methods for the measurement of hardness of metallic materials, such as hardness according to Brinell, Vickers or Rockwell.

The fitting can be produced particularly economically if the coating is applied by electroplating. Thus, one of the pressing surfaces can have a tin coating applied by electroplating, for example. In further embodiments, the coating can, in principle, be applied in any manner. Therefore, dependent on the material of the substrate and the material of the coating to be applied, known coating methods, such as hot dipping or powder coating, can be drawn on.

The following processes can optionally be applied when coating the components. Chemical vapour deposition (CVD), physical vapour deposition (PVD) or sputtering by means of cathodic sputtering can be cited as processes in the gas phase. Processes in the liquid phase are, for example, painting, thermal spraying, hot dipping or spray coating, as well as applying solutions such as electroplating or chemical tin-plating. Thermal spraying, powder coating, surfacing by brazing, plasma-transferred arc welding, deposition welding, fluidised bed sintering or mechanical plating can be cited as processes based on solid materials.

Furthermore, the coating can be formed from an organic sealant. Depending on the requirements for the pipe connection, organic sealants represent a cost-efficient alternative to the previously described metallic coatings. Thus, the coating can, for example, contain silicones, polyurethanes, polytetrafluoroethylene (PTFE) or polysulphides which can be applied by spraying, dipping, brushing, coating with a doctor knife or by pressing on. The hardness of the materials used is determined by the known methods for the measurement of hardness of metallic or organic materials, such as hardness according to Brinell, Vickers or Rockwell or, in the case of organic sealants, hardness according to Shore or IRHD (International Rubber Hardness Degree hardness testing method).

In addition, the coating, in particular a metallic coating, can have a layer thickness in a range from 1 µm to 20 µm, preferably in a range from 3 µm to 10 µm, more preferably 4 to 7 µm. Practical tests have shown that the advantageous lubricating and/or sealing effect of the coating already occurs for these comparatively modest layer thicknesses, in particular in the case of a coating formed from a soft metal. The layer thicknesses in the case of plastics are preferably in the range from 1 to 200 µm.

The pressing sleeve and/or the main fitting body can only be coated in an area locally limited to the respective pressing surface. Thus, during the coating process, for example, only the area of the fitting to be coated can be brought into contact with the coating material or a part of the component to be coated can be excluded from the coating by masking. Only partial coating can be required if any functional surfaces abutting on the coated area are to remain free from coating material. In addition, the main fitting body and/or the pressing sleeve can be fully coated. In this way, the coating can be produced particularly efficiently and cost-effectively.

Particularly in the case where the main fitting body is fully coated, there is the advantage that both the pressing surface, in the installed state, assigned to the pipe to be connected and the pressing surface of the main fitting body assigned to the pressing sleeve are coated. Hence, when the fitting is pressed, the friction between the pipe to be connected and the main fitting body, on the one hand, and between the pressing sleeve and the main fitting body, on the other hand, is reduced.

According to a further embodiment of the fitting, the diameter of the pressing sleeve in the area of its pressing surface is tapered over the length of the pressing sleeve measured in the axial direction. The width is the width of the pressing sleeve measured in the axial direction. The pressing surface of the pressing sleeve is consequently, at least sectionally, oriented transverse to the axial direction to translate an axial movement of the pressing sleeve into a radial narrowing of the main fitting body. Therefore, the degree of deformation of the main fitting body and the pipe to be connected can be set by the design of the diameter of the pressing sleeve tapered over its width. The pressing sleeve can in particular have an inner profile which is tapered in a conical, round or bellied manner.

Thus, the pressing sleeve can, for example, have a receiving area which essentially corresponds to the outer diameter of the main fitting body, so that the main fitting body can be inserted with play into the receiving area. Proceeding from this diameter, the receiving area merges into the pressing surface. In the area of the pressing surface, the pressing sleeve is tapered to an inner diameter which is less than the outer diameter of the main fitting body in the undeformed state. The transition of the receiving area to the pressing surface of the pressing sleeve can in particular be formed without discontinuity, so that the receiving area merges into the pressing surface in an essentially tangentially continuous or curvature continuous manner, in order to enable a pressing process to take place which is as smooth as possible. Tangential continuity or curvature continuity means that the slopes of tangents of adjacent surface elements do not have any discontinuities. By means of the tangential or curvature continuity it is thus ensured that no or only rounded ridges or edges are present in the area between the receiving area and the pressing surface.

According to further embodiments of the fitting, it is also possible to provide on the main fitting body itself a corresponding inclined surface or curved surface to translate an axial sliding movement between the pressing sleeve and the main fitting body into a radial narrowing of the diameter of the main fitting body.

The invention further relates to a pipeline system, having at least one fitting according to the invention and having at least one pipe to be connected to the fitting.

According to one embodiment of the pipeline system, the coating can be provided on the pressing surface assigned to the pipe, wherein the coating can be formed from a softer material compared to the pipe material. In this case, the coating material is particularly well suited for correcting surface defects, such as unevenness, grooves, chips or other defects on the pipe surface and filling in and sealing them when the fitting and the pipe are pressed. Where damaged pipes or pipes which have not been prepared in an optimum way are installed, the pipeline system is thereby robust with respect to leaks which result from the previously mentioned surface defects.

The previously described fitting and the pipeline system due to their robust and cost-effective design are particularly suitable for use in a heating installation, air-conditioning installation, sanitary installation or drinking water installation or in an installation for conveying technical or medical fluids.

BRIEF DESCRIPTION OF THE DRAWINGS

The invention is explained in more detail below by means of exemplary embodiments.

DESCRIPTION OF THE INVENTION

Figure 1:
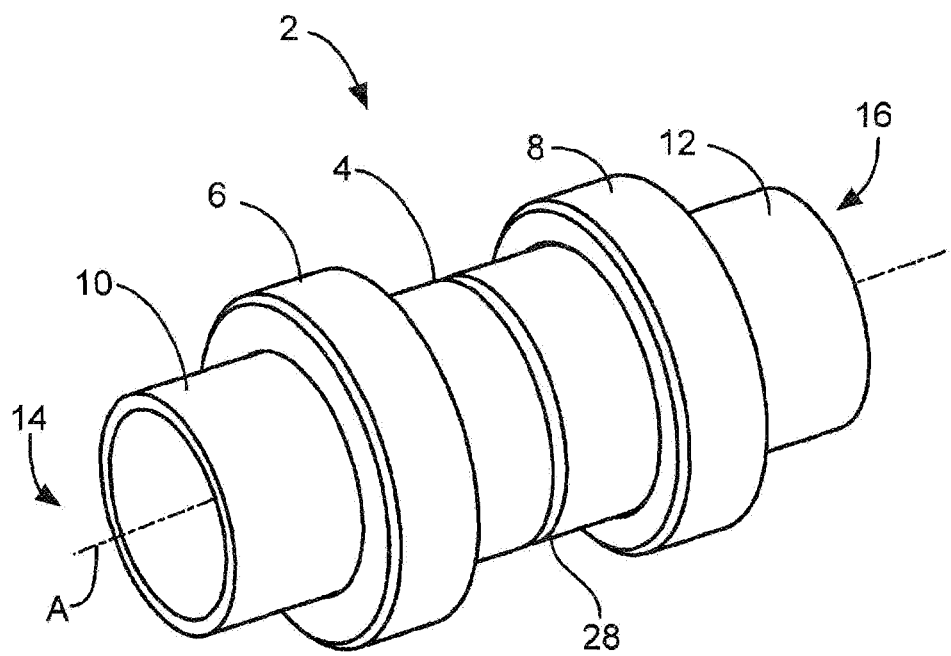
FIG. 1 shows a fitting according to the invention with two pipe ends to be connected, in a perspective view.

FIG. 1 shows a fitting 2 according to the invention for a sealing, non-releasable pipe connection, in a perspective view. The fitting 2 has a main fitting body 4 and two pressing sleeves 6, 8. Two pipe ends 10, 12 of two pipes 14, 16 to be connected are received in the main fitting body 4. The main fitting body 4 and the pressing sleeves 6, 8 are essentially cylindrical in shape. The main fitting body 4, the pressing sleeves 6, 8 and the pipe ends 10, 12 are arranged coaxially to the axis A. The fitting 2 is constructed symmetrically, so that below, by way of example, the pipe connection is described with reference to the pressing sleeve 6 and the pipe end 10, wherein these implementations equally apply for the opposing pipe end 12 and the pressing sleeve 8 assigned to this pipe end 12.

Figure 2:
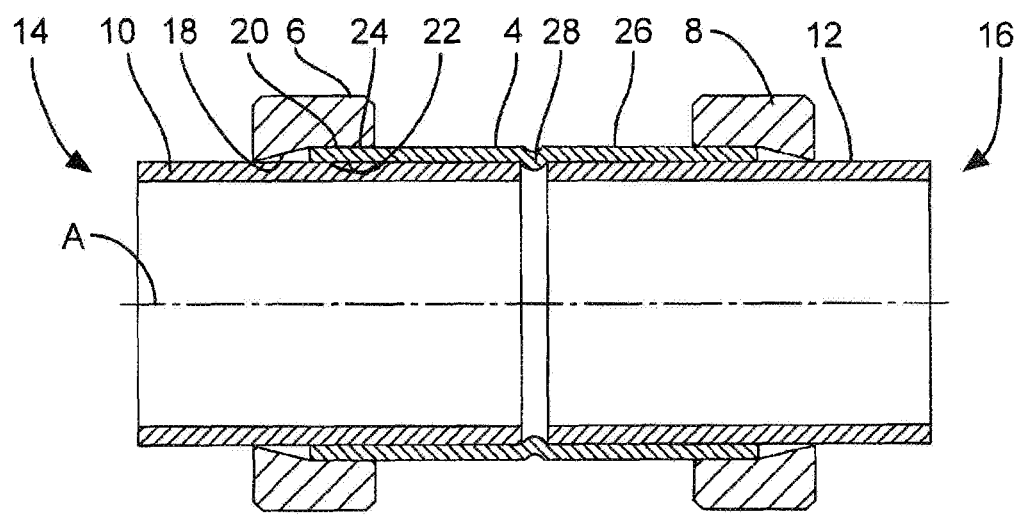
FIG. 2 shows the fitting from FIG. 1 in a cross-section before pressing has taken place.

FIG. 2 shows the fitting from FIG. 1 in a cross-section before pressing has taken place. The main fitting body 4 and the pressing sleeve 6 have pressing surfaces 18, 20 assigned to one another which during the pressing process slide on one another. The main fitting body 4 also has a pressing surface 22 which is assigned to the peripheral region of the main fitting body 4 and which, in the installed state of the fitting 2 illustrated here, is directed towards the pipe 14 to be connected. The pressing sleeve 6 can be pushed onto the main fitting body 4 in the axial direction along the axis A to radially narrow the main fitting body 4.

In the pre-installed position illustrated here, the end of the main fitting body 4 sits in a receiving section 24 of the pressing sleeve 6. Proceeding from the receiving section 24, the pressing sleeve 6 is tapered in the area of its pressing surface 18 over the width measured in the axial direction. Proceeding from the diameter of the receiving section 24 essentially corresponding to the outer diameter of the main fitting body 4, the pressing surface 18 of the pressing sleeve 6 tapers, so that the diameter of the pressing sleeve 6 is essentially tapered to the outer diameter of the pipe end 10. Of course, an installation clearance is provided between the receiving section 24 and the main fitting body 4 and between the pipe end 10 and the tapered pressing surface 18.

The pipe 14, the main fitting body 4 and the pressing sleeve 6 are, by way of example, produced from a copper material or steel/high-grade steel. The main fitting body 4 is provided with a coating 26. The coating 26 is a tin coating applied by electroplating. The layer thickness of the coating 26 is approximately 5 µm. The main fitting body 4 is fully coated. In FIG. 2, this coating material is not illustrated separately due to the modest relative thickness.

When the fitting 2 is pressed with the pipe end 10, the pressing sleeve 6 is pushed onto the main fitting body 4 in the axial direction. A pressing tool, which is not illustrated here and is known, for example, from WO 2014/000897 A1, is used for this purpose. The pressing surface 20 of the main fitting body 4 slides along the pressing surface 18 of the pressing sleeve 6 during the axial movement. The end area of the main fitting body 4 is flanged in a direction turned radially inwards. In other words, the pressing sleeve 6 forms a matrix, wherein the pressing surface 20 of the main fitting body abuts tightly on the tapered pressing surface 18 of the pressing sleeve 6 during the pressing process, so that the end area of the main fitting body 4 slides along the inner contour of the pressing sleeve 6 and is thereby plastically deformed. The shape of the pressing sleeve 6 essentially remains unchanged.

Figure 3:
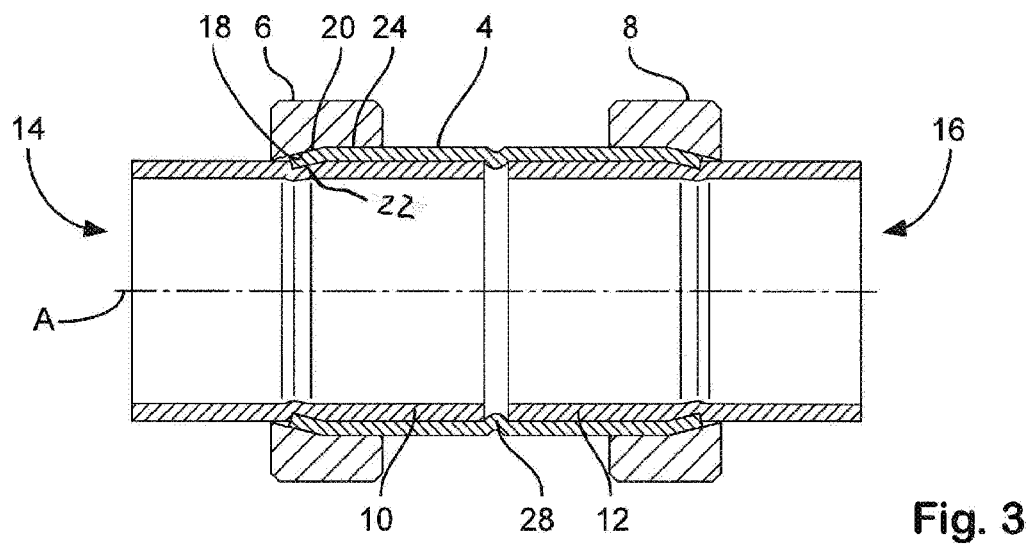
FIG. 3 shows the fitting from FIG. 1 in a cross-section after pressing has taken place.

In FIG. 3, the fitting 2 from FIG. 1 is illustrated in a cross-section after pressing has taken place. The pipe 14 is likewise deformed in the area of the deformed end area of the main fitting body 4 and distorted with the main fitting body 4 by means of the pressing sleeve 6. The face sides of the end sections 10, 12 of the pipes 14, 16 are arranged spaced apart from one another by a stop 28 inside the main fitting body. The end section 12 of the pipe 16 is pressed in a similar way to the end section 10 of the pipe 14.

In FIG. 4, several possibilities for designing the tapered inner profile of the pressing sleeves 6, 8 are illustrated.

Figure 4A:
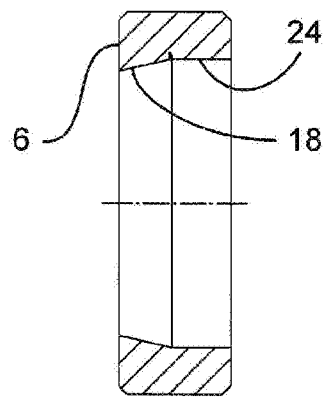
FIGS. 4a-d show various designs of an inner profile of a pressing sleeve according to the invention.

In FIG. 4a, the profile of the pressing sleeve 6 illustrated in cross-section has a cylindrical receiving section 24. Proceeding from the receiving section 24, the profile is tapered.

Figure 4B:
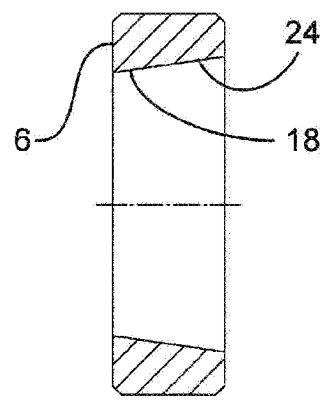
Figure 4C:
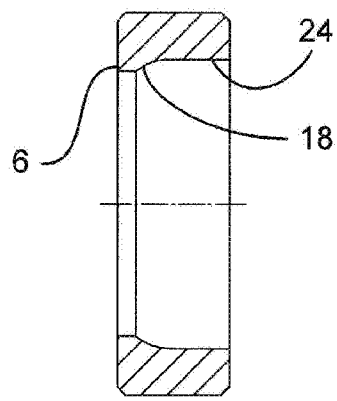
Figure 4D:
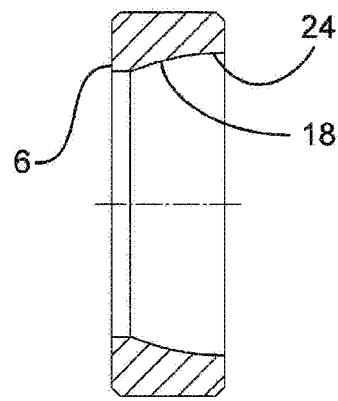

FIGS. 4b to 4d in each case show profile shapes, in which the receiving section 24 merges into the respective pressing surface 18 without discontinuity. On the one hand, by means of these profile shapes in the area of the (smooth) transition from the receiving section 24 to the pressing surface 18 through the flat gradient provided in this area, a pre-installation of the pressing sleeve 6 on the main fitting body 4 can take place, in which the pressing sleeve 6 is held in a self-retaining manner on the main fitting body 4. In addition, at the beginning of the pressing process, starting from this pre-installation position, pushing the pressing sleeve 6 on is made easier by the transition free of discontinuity.

FIG. 4b shows an inner contour or an inner profile with an overall conical course with an even gradient. The receiving section 24 and the pressing surface 18 merge smoothly into one another. In FIG. 4c, a cylindrically-shaped receiving section 24 merges into a pressing surface 18 which is tapered in a bellied manner. Finally, FIG. 4d shows a pressing sleeve 6 with an inner contour which is continuously curved in the area of the receiving section 24 and the pressing surface 18.

The effect of the coating 26 on the pipe connection is illustrated below by means of FIG. 5. In particular, the individual FIGS. 5a to 5c respectively show enlargements of a section of the pipe connections in cross-section, wherein these figures schematically reflect test results of tested pipe connections. The illustrated pipe connections were subjected to torsional load after pressing of the fitting 2, 30 had taken place. An enlargement of the area "Z" of the pipe connection is illustrated in each case.

Figure 5A:
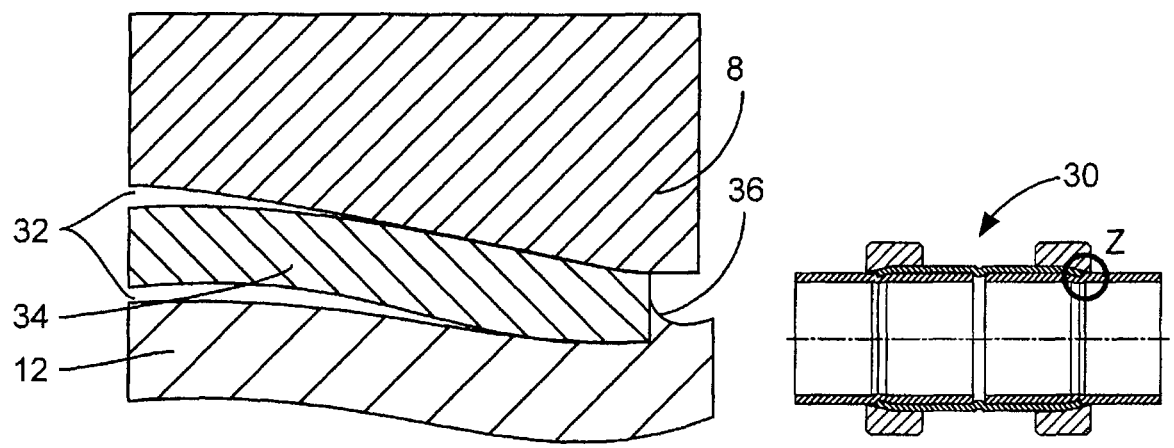
FIG. 5a shows an uncoated fitting with a pipe after pressing has taken place.

FIG. 5a shows a non-releasable, sealing pipe connection which was produced using an uncoated fitting 30 corresponding to the prior art. As can be identified from the enlarged illustration, as a result of the joining operation the gaps 32 have been formed between the pressing sleeve 8, the main fitting body 34 and the pipe end 12 to be connected. In addition, due to the torsional load and/or the pressing process a ridge 36 has been formed which the main fitting body 34 has pushed up on the pipe end 12 to be connected.

Figure 5B:
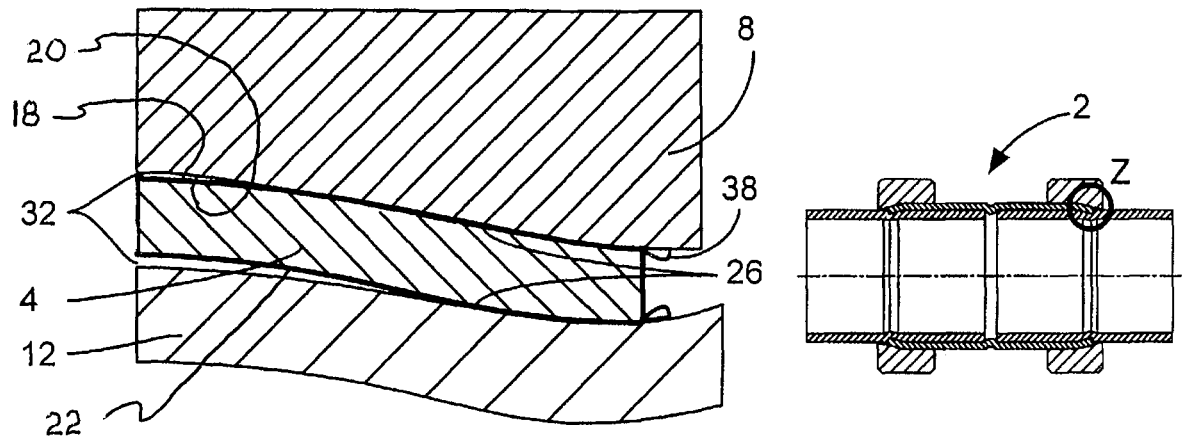
FIG. 5b shows a coated fitting according to the invention with a pipe after pressing has taken place wherein the coating is only on the main fitting body.

FIG. 5b shows a non-releasable, sealing pipe connection which was produced using a fitting 2 according to the invention. The main fitting body 4 is tin-plated with a layer thickness of approximately 5 μm. The gaps 32 between the pressed components pressing sleeve 8, main fitting body 4 and pipe end 12 have been considerably reduced by the lubricating effect of the coating 26 compared to the previously illustrated uncoated state. In addition, no ridge was pushed up between the main fitting body 4 and the pipe end 12 as a result of the torsional load. Compared to the uncoated variant, there is a far flatter and overall enlarged contact between the pressed components, in particular between the main fitting body 4 and the pipe end 12.

Figure 5C:
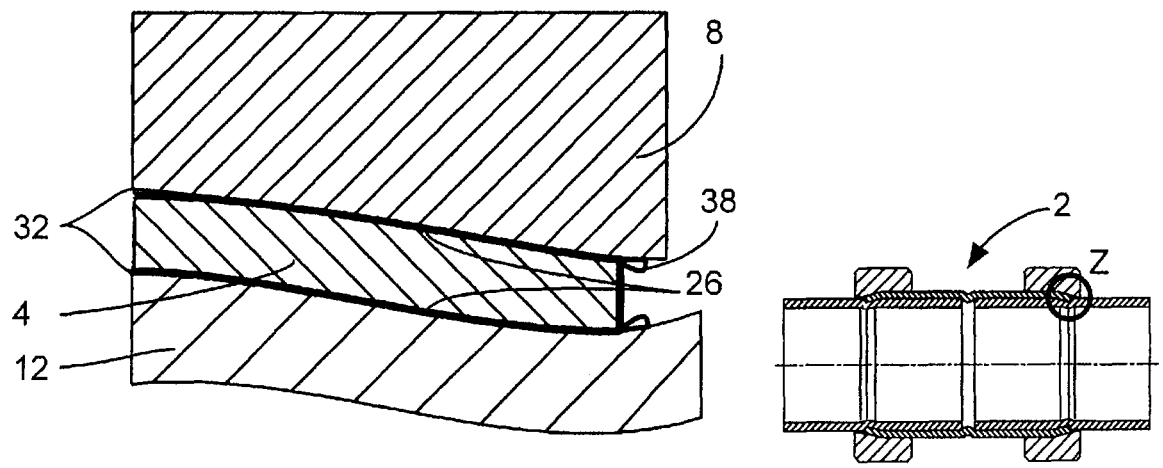
FIG. 5c shows a further coated fitting according to the invention with a pipe after pressing has taken place.

FIG. 5c also shows a non-releasable, sealing pipe connection which was produced using a fitting 2 according to the invention. The main fitting body 4 is tin-plated with a layer thickness of 10 μm. Again, it is apparent that there is a far flatter and overall enlarged contact between the pressed components compared to the uncoated fitting 30. With a layer thickness of tin plating which is greater compared to FIG. 5b, the gaps 32 between the pressing sleeve 8, the main fitting body 4 and the pipe end 12 were able to be further reduced.

Figure 6:
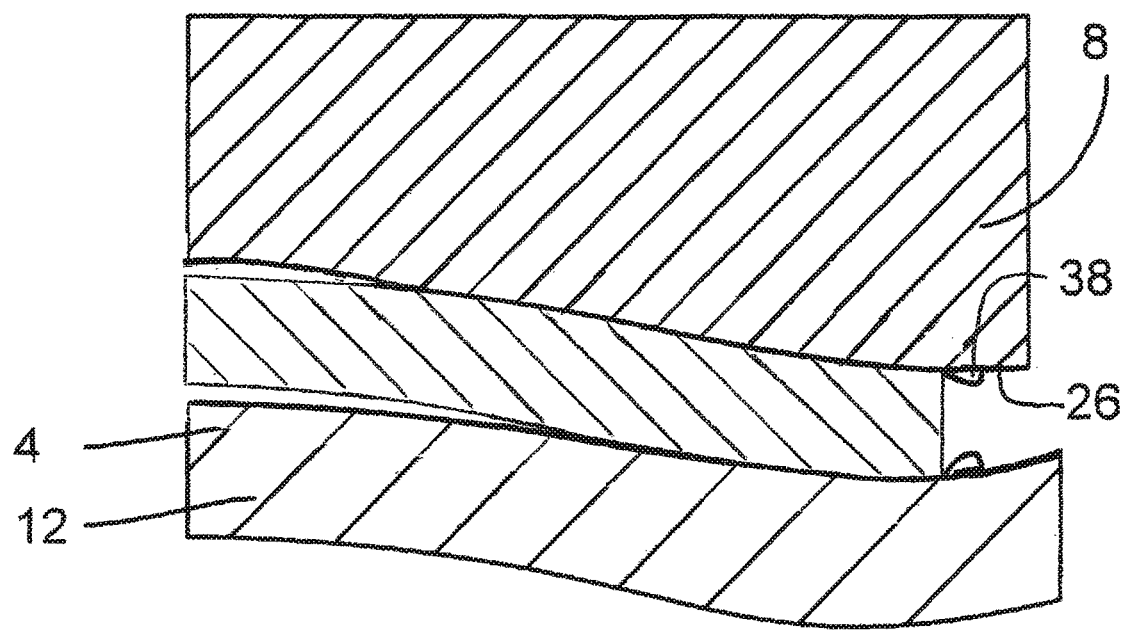
FIG. 6 shows an embodiment similar to that of FIG. 5b but with coating only on the sleeve.
Figure 7:
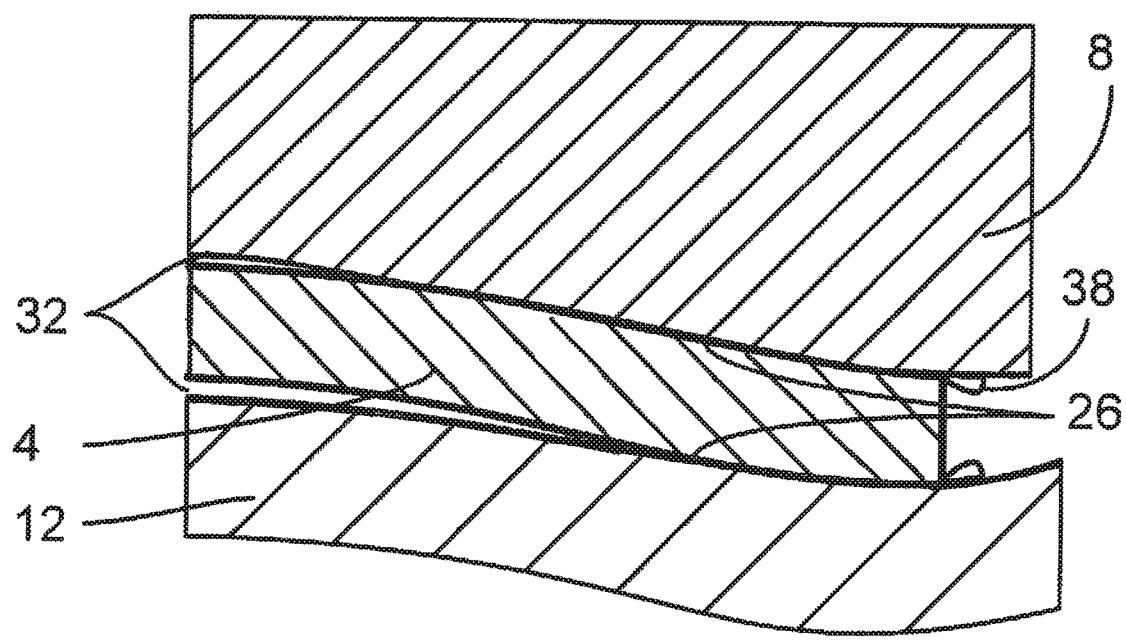
FIG. 7 shows an embodiment similar to that of FIG. 5b but with coating on both the main fitting body and sleeve.
Figure 8:
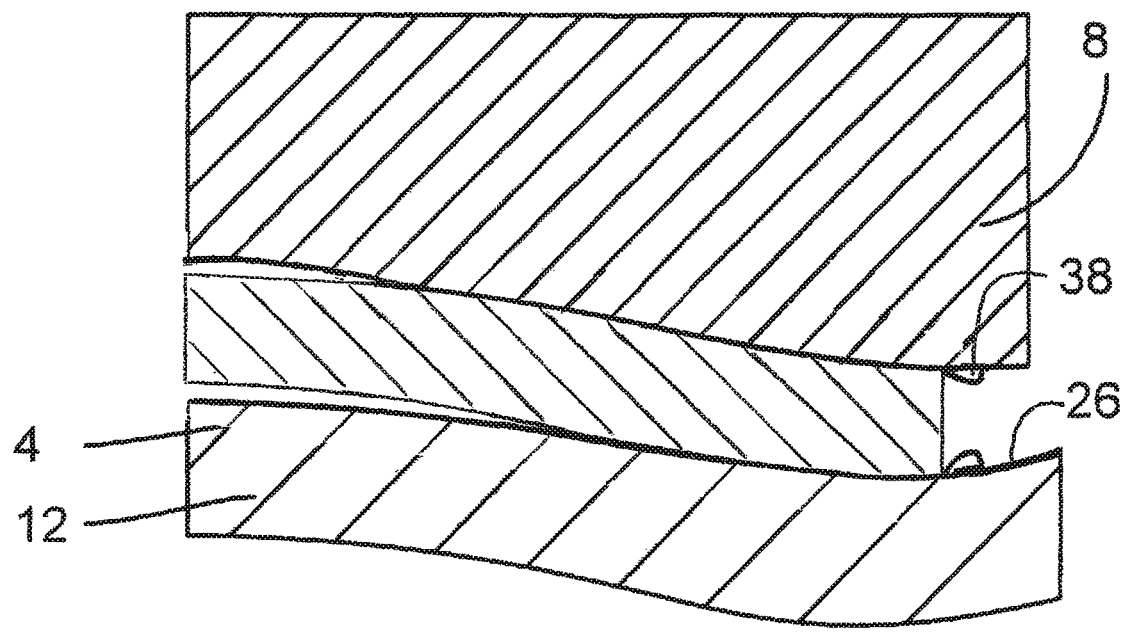
FIG. 8 shows an embodiment similar to that of FIG. 5b but with coating only on the main fitting body

FIGS. 6, 7 and 8 show embodiments wherein the coating 26 is only on the sleeve 8, wherein the coating 26 is on both the sleeve 8 and the main fitting body 4, and wherein the coating 26 is only on the main fitting body 4.

As a result of the installation process or the operating loads, tin stoppers 38 can form between the pressing sleeve 8 and the main fitting body 4 and/or between the main fitting body 6 and the pipe end 12, which additionally seal the connection.

The invention claimed is:

1. A fitting for a sealing, non-releasable pipe connection, comprising:
   a main fitting body for accommodating at least one pipe which is to be connected, and
   at least one pressing sleeve,
   wherein the main fitting body and each of the at least one pressing sleeves have pressing surfaces which are assigned to one another,
   wherein the main fitting body has a pressing surface which, in the installed state, is directed towards the pipe which is to be connected and is assigned to a peripheral region of the main fitting body,
   wherein the pressing surfaces assigned to one another on the main fitting body and on the pressing sleeve are formed such that the act of pushing the pressing sleeve axially onto the main fitting body gives rise to a peripheral region of the main fitting body being narrowed radially,
   wherein a coating is provided between the pressing surface of the pressing sleeve and the pressing surface of the main fitting body, which are assigned to one another, and on the pressing surface which, in the installed stated, is directed towards the pipe which is to be connected and is assigned to the peripheral region of the main fitting body,
   wherein the coating consists of a material which is softer than that of the pressing sleeve and/or of the main fitting body,
   wherein the coating is formed from a soft metal or from a soft metal alloy,
   wherein the coating has a thickness comprised in a range from 4 μm to 10 μm,
   wherein the pressing surfaces assigned to one another on the main fitting body and on the pressing sleeve slide relative to one another over the coating during a pressing process, and
   wherein the end area of the main fitting body is flanged in a radially inward direction.

2. The fitting according to claim 1, wherein at least one of the pressing surfaces is tin-plated.

3. The fitting according to claim 1, wherein the coating is applied by electroplating, hot dipping, or powder coating.

4. The fitting according to claim 3, wherein the coating has a layer thickness in a range from 4 to 7 µm.

5. The fitting according to claim 1, wherein the coating is formed from an organic sealant.

6. The fitting according to claim 1, wherein the coating has a layer thickness in a range from 4 to 7 µm.

7. The fitting according to claim 1, wherein the pressing surface of the main fitting body or the pressing sleeve are fully coated.

8. The fitting according to claim 1, wherein a diameter of the pressing sleeve, at least in the area of its pressing surface, is tapered over a length of the pressing sleeve measured in the axial direction, wherein the pressing sleeve has an inner profile which is tapered in particular in a conical, round or bellied manner.

9. The fitting according to claim 1, wherein the inner profile of the pressing sleeve is formed without discontinuity, in particular tangentially continuous or curvature continuous.

10. The fitting according to claim 1, wherein at least one of the pressing surfaces is tin-plated.

11. The fitting according to claim 1, wherein the coating is applied by electroplating, hot dipping, or powder coating.

12. The fitting according to claim 1, wherein the pressing surfaces of the main fitting body and the pressing sleeve are fully coated.

13. A pipeline system, comprising:
at least one fitting according to claim 1, and
at least one pipe to be connected to the fitting.

14. The pipeline system according to claim 13, wherein the coating is formed from a softer material compared to the pipe material.

15. The pipeline system according to claim 13, wherein the coating is applied by electroplating, hot dipping, or powder coating.

16. The pipeline system according to claim 13, wherein the coating is formed from an organic sealant.

17. The pipeline system according to claim 13, wherein the pressing surfaces of the main fitting body and the pressing sleeve are fully coated.

18. The pipeline system according to claim 13, wherein a diameter of the pressing sleeve, at least in the area of its pressing surface, is tapered over a length of the pressing sleeve measured in the axial direction, wherein the pressing sleeve has an inner profile which is tapered in particular in a conical, round, or bellied manner.

* * * * *